March 11, 1969 — L. GIULIETTI — 3,431,896
VALVE TAPPETS AND METHOD OF MAKING SAME
Filed Feb. 14, 1968
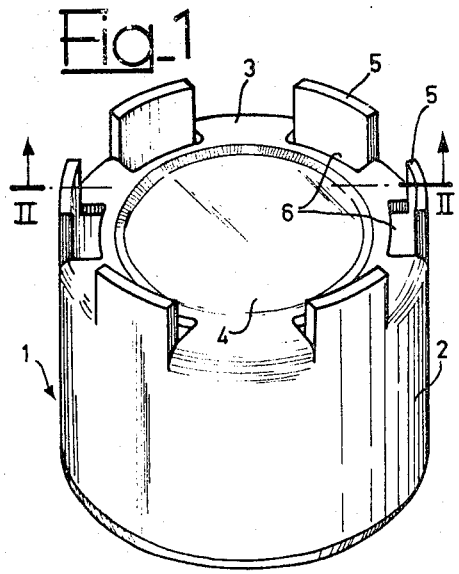
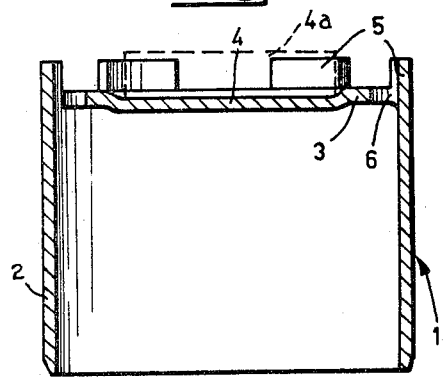
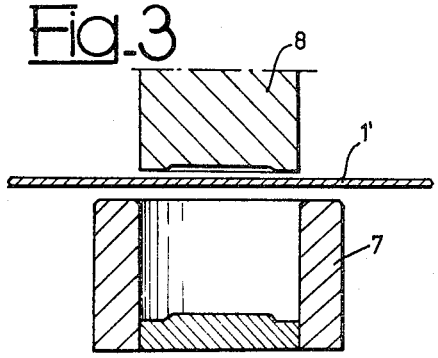

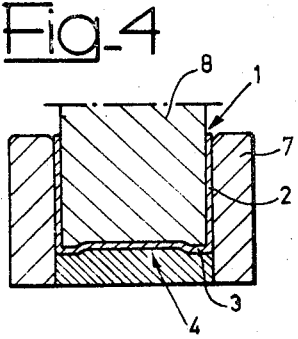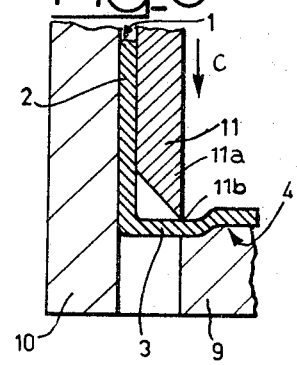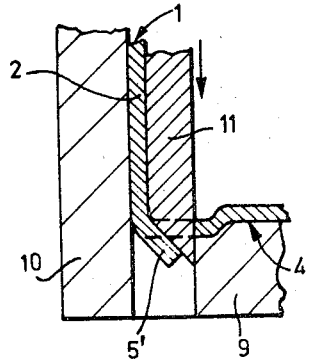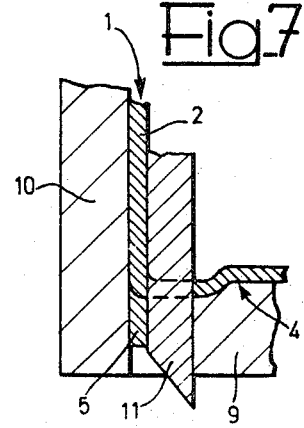

United States Patent Office 3,431,896
Patented Mar. 11, 1969

3,431,896
VALVE TAPPETS AND METHOD OF
MAKING SAME
Luciano Giulietti, Turin, Italy, assignor to RIV-SKF
Officine di Villar Perosa S.p.A., Turin, Italy
Filed Feb. 14, 1968, Ser. No. 705,508
Claims priority, application Italy, Feb. 23, 1967,
795,674
U.S. Cl. 123—90                           8 Claims
Int. Cl. F01l 1/14; B23p 15/00; F16h 53/06

ABSTRACT OF THE DISCLOSURE

A valve tappet for an overhead camshaft engine is made from a sheet metal cup member by cutting a plurality of tongues around the edge of the end wall of the cup member and bending the tongues about said edge to form upstanding teeth comprising a discontinuous annular ridge surrounding a seating for a tappet spacer element on said end wall.

---

This invention concerns improvements in or relating to valve tappets for internal combustion engines, more particularly for internal combustion engines of the overhead camshaft type.

In engines of this type tappets are interposed between respective valve operating cams on an overhead camshaft and respective valve stems. A known form of tappet includes a cup member adapted to be fitted co-axially over the upper end of the respective valve stem so that the end wall of the cup member is interposed between the said end of the valve stem and the respective operating cam. Conventionally, the end wall of the cup member is formed with a shallow recess facing the respective cam and surrounded by an annular raised ridge around the edge of the end wall. An interchangeable spacer element in the form of a disc of a predetermined thickness is seated in the recess to give a required tappet clearance between the respective cam and the end of the respective valve stem.

Usually the annular ridge surrounding the said recess is interrupted by a notch to permit the insertion of a tool such as a screwdriver beneath the spacer element so as to facilitate removal of the spacer element when desired.

The manufacture of tappets of this type has hitherto proved relatively complicated and expensive due to the difficulty of forming the raised ridge and the required notch or notches therein. An object of the present invention is to facilitate the manufacture of valve tappets of the above type, using relatively simple and inexpensive tools and machines such as are usually available in workshops.

A further object of the invention is to provide a valve tappet of the above type which is formed from a single piece of sheet metal.

Accordingly the main characteristic features of the method of manufacturing a valve tappet according to the invention comprise cutting a plurality of tongues in a sheet metal cup member, said tongues extending from and being spaced apart at intervals around the edge of the end wall of the cup member, and bending each tongue about said edge to form a plurality of upstanding teeth constituting a discontinuous annular ridge surrounding a seating on the external surface of said end wall for the reception of a tappet spacer element.

Preferably the sheet metal cup member is formed initially by pressing from a planar sheet metal blank.

Preferably the tongues are cut in the end wall and the cutting and bending of the tongues to form the teeth are effected simultaneously.

The invention further provides a valve tappet comprising a sheet metal cup member having a plurality of upstanding teeth spaced apart at intervals around the edge of the end wall of the cup member and forming a discontinuous annular ridge surrounding a seating on the external surface of said end wall for the reception of a tappet spacer element, each said tooth being an integral part of a single piece of sheet metal from which the cup member is formed.

The invention will be further understood from the following description, given by way of non-limiting example, with reference to the accompanying drawings, in which:

FIGURE 1 is a perspective view of a valve tappet according to one embodiment of the present invention;

FIGURE 2 is an axial cross sectional view on line II—II of FIGURE 1;

FIGURES 3 and 4 are respective diagrammatic sectional views illustrating the initial step in the formation of the valve tappet of FIGURES 1 and 2 from a sheet metal blank; and FIGURES 5, 6 and 7 are diagrammatic sectional views illustrating successive stages in the formation of the tappet, following the step shown in FIGURES 3 and 4.

FIGURES 1 and 2 show a valve tappet 1 for location over the upper end of a valve stem in an overhead camshaft internal combustion engine. The valve tappet comprises a cup member 1 having a cylindrical side wall 2 and a flat end wall 3. The end wall 3 is formed with a central shallow recess 4 in its outer surface for the reception of a spacer element 4a (shown in broken outline in FIGURE 2) in the form of a circular disc of hard material having a predetermined thickness in accordance with the required tappet clearance.

The recess 4 is surrounded by a plurality of upstanding teeth 5 spaced apart at equal intervals around the edge of the end wall 3, each tooth 5 comprising in effect an extension of the side wall 2 of the cup member 1. The teeth 5 form a discontinuous annular ridge surrounding the external surface of the end wall 3. The gaps between adjacent teeth 5 allow access for a tool when removing the spacer element 4a from its seating on the end wall 3, for example when changing the tappet clearance.

The tappet is manufactured in a single piece from sheet metal, the cup member 1 being pressed from a circular sheet metal blank 1', as illustrated in FIGURES 3 and 4, using a cold forming process. The blank 1' is placed between a hollow die matrix 7 and a relatively movable punch 8 which are then advanced towards each other in the conventional manner (FIGURE 4) to form the cup member 1, complete with the recess 4 in its end wall 3, but without the teeth 5.

The teeth 5 are subsequently formed in the cup member 1 by placing the latter in a die matrix comprising an end wall 9 and a cylindrical side wall 10 (FIGURES 5–7) and cutting a plurality of tongues in the end wall 3 by means of respective tools 11 movable within the cup member 1 parallel to the axis thereof. Each tool 11 has a cutting tip 11a which tapers radially inwardly to a cutting edge 11b extending substantially circumferentially with respect to the axis of the cup member 1.

The tools 11 are advanced in unison towards the end wall 3 of the cup member 1 in the direction of arrow C in FIGURES 5 and 6, and in so doing cut respective inwardly extending tongues 5' (FIGURE 6) in the end wall 3, at spaced intervals around the edge of said wall, simultaneously bending each tongue 5' about said edge to form the respective teeth 5 (FIGURE 7) on completion of the stroke of the tools 11. Respective apertures 6 (FIGURES 1 and 2) are formed in the end wall 3 at each region from which a tongue 5' is cut.

It will be seen that the tappet according to the invention is made by relatively simple and inexpensive stamping and cutting steps in sequence from a single piece of sheet metal, with minimal wastage of material.

It will be appreciated that various modifications may be made in the tappet and the method of manufacturing it without departing from the scope of the invention. For example, the tappet according to the invention can be formed by starting with a sheet metal cap member and performing merely the operations described with reference to FIGURES 5–7, instead of starting with a planar sheet metal blank. Also, the tongues 5' from which the teeth 5 are formed could, for example, be cut in the side wall 2 of the cup member around the edge of the end wall 3 and subsequently bent outwardly and upwardly to form the teeth 5.

What is claimed is:

1. A method of manufacturing a valve tappet of the type comprising a metal cup member having an end wall, a side wall, a seating for a spacer element on the external surface of the end wall, and an annular ridge around the end wall surrounding the seating, said method being characterised by the steps of cutting a plurality of tongues in the cup member, said tongues extending from and being spaced apart at intervals around the edge of the end wall, and bending each tongue about said edge of the end wall to form a plurality of teeth upstanding from the edge of said end wall, said teeth constituting a discontinuous annular ridge surrounding the seating on the external surface of the end wall.

2. A method as claimed in claim 1 including an initial step of pressing the cup member from a planar sheet metal blank.

3. A method as claimed in claim 1 wherein the tongues are cut in the end wall and the cutting and bending steps are effected simultaneously.

4. A method as claimed in claim 3 wherein relative axial movement is effected between the cup member and a plurality of tools arranged at intervals around the edge of the end wall inside the cup member to effect simultaneous cutting and bending of said tongues to form the teeth.

5. A method as claimed in claim 4 wherein each tool extends axially within the cup member and has a cutting tip tapering inwardly towards the axis of the cup member to a cutting edge extending substantially circumferentially with respect to the axis of the cup member.

6. A method as claimed in claim 2 wherein a shallow centrally located recess forming the seating for the spacer element is formed in the end wall by the initial pressing operation.

7. In a valve tappet of the type comprising a metal cap member having an end wall and a side wall, a seating for a spacer element on the external surface of the end wall, and an upstanding annular ridge surrounding said seating, the improvement which comprises the said annular ridge being discontinuous and being constituted by a plurality of teeth spaced apart at intervals around the edge of the end wall of the cup member, each tooth being an integral part of the cup member, and the cup member comprising a single piece of sheet metal.

8. Valve tappet as claimed in claim 7 wherein each tooth forms an effective continuation of the side wall of the cup member outwardly of the end wall.

References Cited

UNITED STATES PATENTS

| 1,340,211 | 5/1920 | Breeze | 123—90 |
| 1,345,942 | 7/1920 | McCain | 29—156.7 |
| 1,695,726 | 12/1928 | Woolson. | |

FOREIGN PATENTS

| 983,932 | 2/1951 | France. |

AL LAWRENCE SMITH, *Primary Examiner.*

U.S. Cl. X.R.

29—156.7; 74—569